2,733,222
FATTY ACID ESTERS OF EPOXY RESINS AND ALKYL TITANATES

Harry H. Beacham, Plainfield, N. J., assignor to National Lead Company, New York, N. Y., a corporation of New Jersey No Drawing. Application December 1, 1952, Serial No. 323,523

5 Claims. (Cl. 260—18)

This invention relates to film-forming and drying compositions of matter. More specifically, it relates to film-forming compositions containing epoxy resins. Still more specifically, it relates to such coating compositions which are relatively fast drying and easily cured compared with those heretofore known.

The so-called epoxy resins constitute one of the newer and more useful classes of resins for use in coating compositions. These resins are ordinarily prepared by condensation of phenols with ketones to form bisphenols and subsequent reaction of the bisphenol with an epichlorohydrin to produce a resin monomer. This resin monomer is then polymerized, using a basic catalyst such as an amine to form a linear polymer having the repeating unit formula:

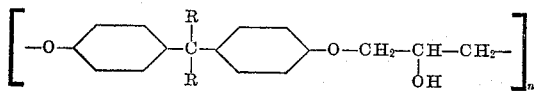

wherein $n$ is ordinarily about 3 to 4 and the two R groups are those of the ketone used. This partially polymerized epoxy resin may then be used in varnish or other coating formulations along with suitable drying oils, thinners, etc. The usual practice is to esterify at least some of the secondary hydroxyl groups of the above formula with suitable drying-oil fatty acids. This is conveniently done by merely heating the partially polymerized resin with the desired drying-oil acid according to cooking techniques well known to the art. The resulting oil-modified epoxy resin may then be employed, after suitable thinning and if desired, the addition of further drying-oil and with other incidental varnish ingredients, as an oleoresinous type varnish. When such finishes are dried a partial drying and cross linking is obtained by oxidation of the unsaturated bonds in the drying-oil portion of the molecule. However, to achieve the maximum polymerization and to produce the highly-polymerized type of film usually desired, it is also desirable to effect concurrently therewith a different type of polymerization, namely the further linear polymerization of the partially polymerized epoxy chain to chains of great length. Among the so-called "converting agents" in common use to bring about the second polymerization or "curing" are diethylene triamine and butylated urea-formaldehyde. These agents and others of the sort suffer, however, from numerous disadvantages, among which may be mentioned that even when these curing agents are used, excessively high temperatures, for example 375 to 450° C., are often required. Although diethylene triamine in sufficiently large quantities will bring about room-temperature drying, the use of this agent, particularly in large quantities, is undesirable because it causes dulling and clouding in the film. These known agents suffer from another serious disadvantage in that their curing action cannot be controlled, and although excessive temperatures are required for complete curing, a partial polymerization takes place almost immediately upon addition of curing agent even at room temperature, and this limits the use of these compositions to applications which will tolerate the addition of converting agent just before use.

An object of this invention, therefore, is to provide an improved epoxy resin coating composition. A further object is to produce a coating composition which may be cured to a clear film at room temperature or upon light oven heating. An additional object is to provide an epoxy resin coating composition which may be shipped and stored in ready-for-use condition. Another object is to provide an epoxy resin coating composition having improved hardness, adhesion and solvent resistance. Still another object is to provide a coating composition having improved dielectric strength. Other objects and advantages will become apparent from the following more complete description and claims.

In its broadest aspects this invention contemplates a film-forming composition comprising an oil-modified epoxy resin and an alkyl titanate. In a particularly desirable embodiment this invention contemplates a film-forming composition comprising an oil modified epoxy resin having the repeating unit formula:

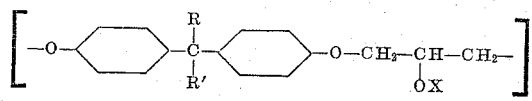

wherein R and R′ represent aliphatic or aromatic hydrocarbon groups, at least half of the X groups in said repeating unit are the acyl groups of drying-oil fatty acids and the remainder of said X groups are hydrogen atoms, and an alkyl titanate. Substantially any oil-modified, oil-soluble epoxy resin may be employed, but it is preferred that at least half the secondary hydroxyl groups of said resin be esterified with drying-oil fatty acids, since a lower degree of esterification tends to increase the reactivity of the resin and in some cases results in diminished can-stability. Moreover, substantially any alkyl titanate may be employed, but it is preferred that the alkyl titanate chosen be a titanate of an alcohol containing no more than about 20 and especially preferably no more than about 12 carbon atoms. The titanates of higher alcohols, when they react with the epoxy resin, produce as by-products alcohols which are dispersed in the film and are not sufficiently volatile to be evaporated under light oven-drying. While the presence of alcohol in the film is not necessarily undesirable and may even serve in some cases a useful purpose such as plasticizing the film, it is generally preferred that the finished film contain no alcohol, especially since the presence of alcohol tends to retard the polymerization of the epoxy chain. This is most noticeable with varnishes containing the titanates of the low-molecular-weight, active alcohols. Such a varnish may be stored for long periods of time in a covered container, and is not particularly affected by such storage. Once the alcohol is allowed to evaporate, however, the polymerization proceeds, and a film or a gel is produced which is insoluble in alcohol and other common organic solvents. For applications in which air drying is desirable and the presence of an alcohol in the film is undesirable, it is preferable to employ titanates of alcohols which contain no more than about 5 carbon atoms since these alcohols will readily evaporate from the film during the course of drying. On the other hand, it is preferred to use the titanates of alcohols which contain at least two carbon atoms for, although methyl titanates are completely operable, they are somewhat less stable than the titanates of higher alcohols and are therefore less convenient to handle and use.

The exact mechanism of the reactions which take place in the curing of the film is not definitely known, but it is believed that the alkyl titanate reacts with the secondary hydroxyl groups and probably with the terminal groups of the partially polymerized resin chain, to liberate the alcohol corresponding to the titanate employed, while the hydroxyl groups involved are converted to R—O—Ti—O—R linkages.

The following examples are presented to illustrate the preparation and use of the novel coating compositions of this invention. These examples have been selected to illustrate particular typical and preferred embodiments of the invention, but many departures and modifications thereof will suggest themselves to one skilled in the art, without departing from the spirit of the invention, and the invention is therefore not to be limited except as recited in the appended claims. In particular, this invention has been described with reference to compositions prepared from a particular epoxy resin, Epon 1004. This is a commercial resin having a melting point of about 100° C., an epoxy value of about 0.11 epoxy group per 100 grams of resin, about 0.34 equivalent of active hydroxyl groups per 100 grams of resin, and an esterification value of about 0.74 equivalent per hundred grams of resin, and is the only known epoxy resin of this type presently available to the industry in large quantities. It is to be understood, however, that any oil-soluble, oil-modified epoxy resin may be substituted therefor as above described.

*Example I*

200 parts of Epon 1004 were mixed with 280 parts of linoleic acid in a closed stainless steel kettle equipped with an agitator and an inlet near the bottom of the agitator for the introduction of inert gas. The mass was heated until it melted, agitation was started, and heating was continued until a temperature of 480° F. was reached. This temperature was maintained for one hour, after which a stream of nitrogen was introduced through the bottom inlet, and passed through the batch while continuing to maintain the temperature at 480° F., until a sample of the mixture, diluted to 40 per cent solids in a mixture of 90 parts by volume of mineral spirits and 10 parts by volume of methyl isobutyl ketone, had a viscosity of F (Gardner Scale). The batch was then cooled and thinned to 40% solids in a mixture of equal parts by volume of mineral spirits and methyl isobutyl ketone.

To 240 parts (by weight) of the thinned batch were added 5 parts of tetraethyl titanate, 0.1% lead as lead naphthenate, and 0.05% cobalt as cobalt naphthenate.

The resulting titanated varnish was brushed on a steel panel at about 2 mil thickness and allowed to air-dry for 24 hours. The resulting film was clear, light in color and sufficiently flexible to withstand 30% distention on a Bell Telephone Laboratory conical mandrel. The Sward rocker hardness of the dry film was 36. Solvent resistance of the film was tested by comparing it with a similar film, made as described above, but omitting the tetraethyl titanate. Both films were immersed in mineral spirits for two hours at room temperature. The titanated film was unaffected except for slight softening, whereas the untitanted film was softened to a much greater extent and somewhat blistered.

*Example II*

An aluminum paint was prepared from another portion of the varnish prepared in Example I, by adding to it, after thinning to 40% solids but before the titanate addition, a pigmentary aluminum powder, in the ratio 80 parts by weight of thinned varnish to 20 parts by weight of aluminum. Lead and cobalt driers were added as described in Example I, and in place of the ethyl titanate, tetrabutyl titanate was added in amount to give 10% butyl titanate, based on the resin solids. The resulting paint was applied to a steel panel and air-dried for 24 hours. The resulting film was bright and metallic in appearance, and had hardness, flexibility and solvent resistance similar to those of the unpigmented film described in Example I. A portion of this paint was stored in a covered paint can for three months, and then applied to another steel panel, dried and tested as above. The film produced was substantially identical with that produced by the freshly-prepared paint.

*Example III*

A varnish was prepared from Epon 1004 and dehydrated castor oil fatty acids by mixing 2540 parts of Epon 1004 and 1695 parts of dehydrated castor oil fatty acids in a kettle of the type described in Example I, melting, agitating as in Example I and heating to 400° F. The temperature was then increased gradually from 400° to 500° F. over a period of two hours. When the temperature reached 500° F., a stream of nitrogen was passed through the batch and the temperature was maintained at 500° F. while continuing passage of nitrogen until the acid value of the mixture was 2.0. The mixture was then cooled and diluted to 40% solids in xylol.

To 240 parts of the thinned varnish were added 20 parts of tetraundecyl titanate. The resulting titanated varnish was applied to a steel panel with a .003" film applicator and dried for ½ hour at 212° F. Dielectric strength of the resulting film was high—in fact, too high to be measured with the equipment available, until the film had been immersed in water for 24 hours. After 24 hours water immersion, the dielectric strength of the film was 1200 volts/mil at 3.5 mil film thickness, and a Sward rocker hardness of 24. For purposes of comparison, a similar film was prepared, omitting the undecyl titanate. When measured under the same conditions, the untitanated film had a Sward rocker hardness of 8 and a dielectric strength of 890 volts/mil. The untitanated film moreover exhibited severe blushing, whereas the titanated film was substantially unchanged in appearance after 24 hours' water immersion. The titanated film was sufficiently flexible, both before and after the water immersion, to withstand 30% (or more) distention on the conical mandrel.

The titanated epoxy resin varnishes of this invention are easily and rapidly cured and yield exceptionally hard, tough impervious films. The films produced, moreover, are highly resistant to the action of water and organic solvents, and possess greatly improved dielectric strength. They may be stored for extended periods and used at any time without the employment of additional curing agents.

While this invention has been described and illustrated by the examples shown, it is not intended to be strictly limited thereto and other modifications and variations may be employed within the scope of the following claims.

I claim:

1. A fluid film-forming composition comprising an oil-modified epoxy resin made from bisphenol and epichlorohydrin and having the repeating unit formula:

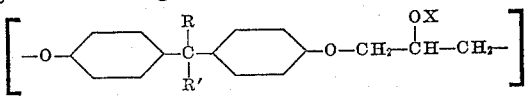

wherein R and R' are monovalent hydrocarbon radicals, at least half of the X groups in said repeating unit are drying-oil acyl groups, the remainder of said X groups being hydrogen atoms, and an alkyl titanate.

2. Composition according to claim 1 wherein said oil-modified epoxy resin is an epoxy resin at least partially esterified with fatty acids of an oil selected from the group consisting of linseed and dehydrated castor oils.

3. Composition according to claim 1 wherein said alkyl titanate is a titanate ester of an alcohol containing from 1 to 20 carbon atoms.

4. Composition according to claim 1 wherein said alkyl titanate is a titanate ester of an alcohol containing from 1 to 12 carbon atoms.

5. Composition according to claim 1 wherein said alkyl titanate is a titanate ester of an alcohol containing from 2 to 5 carbon atoms.

References Cited in the file of this patent

UNITED STATES PATENTS

| | | |
|---|---|---|
| 2,456,408 | Greenlee | Dec. 14, 1948 |
| 2,620,318 | Boyd et al. | Dec. 2, 1952 |
| 2,680,723 | Kronstein | June 8, 1954 |